G. ROGERS.
CONTAINER.
APPLICATION FILED DEC. 19, 1910.
1,015,638.
Patented Jan. 23, 1912.
2 SHEETS—SHEET 1.
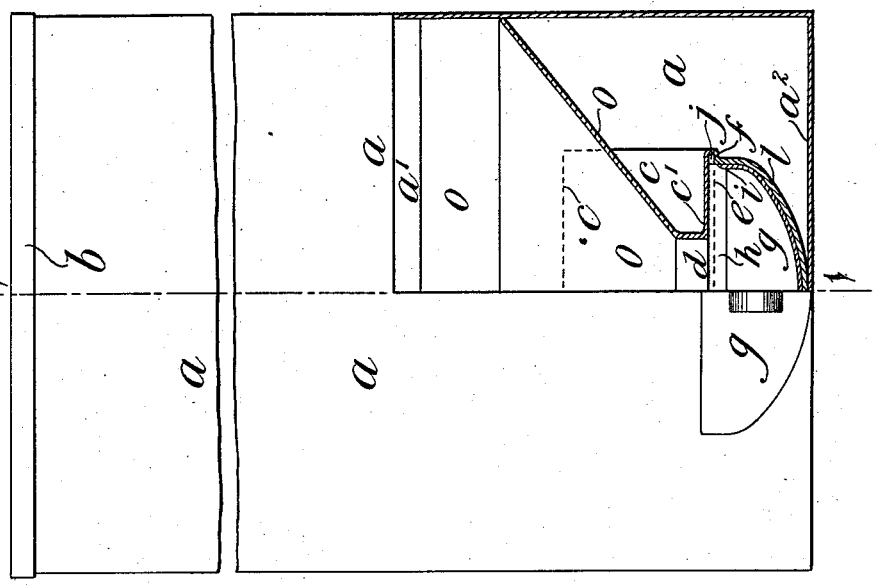
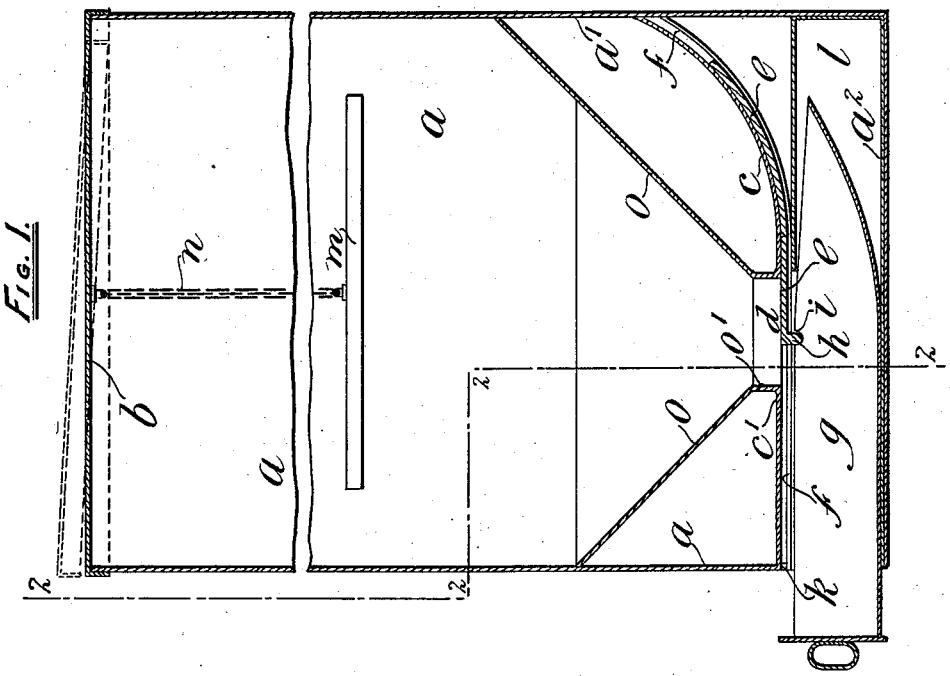
Witnesses—
Inventor—
George Rogers.
by his Attorneys—

G. ROGERS.
CONTAINER.
APPLICATION FILED DEC. 19, 1910.

1,015,638.

Patented Jan. 23, 1912.

2 SHEETS—SHEET 2.

Witnesses:—

Inventor-
George Rogers,
by his Attorneys-

UNITED STATES PATENT OFFICE.

GEORGE ROGERS, OF KILMALCOLM, SCOTLAND.

CONTAINER.

1,015,638.  Specification of Letters Patent.  Patented Jan. 23, 1912.

Application filed December 19, 1910. Serial No. 598,117.

*To all whom it may concern:*

Be it known that I, GEORGE ROGERS, engineer, a subject of the King of Great Britain and Ireland, and residing at Kilmalcolm, Renfrewshire, Scotland, have invented new and useful Improvements in Containers, of which the following is a specification.

This invention has reference to improvements in and relating to bins, canisters and like vessels for storing tea, sugar, cereals, and such like substances in houses, grocers' shops, stores and like premises with the object of economizing the time of the attendant and facilitating the easy delivery of the substances from the vessels.

In order that others skilled in the art to which my invention relates may be able to properly understand same I have hereunto appended two sheets of explanatory drawings in which—

Figure 3:
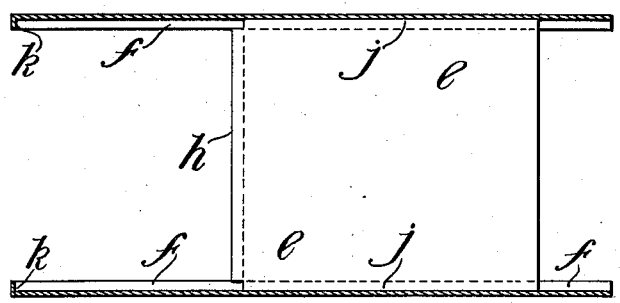
Figure 4:
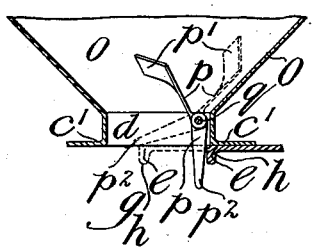
Figure 5:
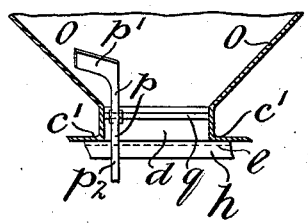

Figure 1 is a sectional elevation of a bin or canister, for storing tea, sugar, cereals and other substances, as constructed according to my improvements, the section being taken on the line 1—1 of Fig. 2 which is an elevation partly in section, corresponding to same, the section being taken on the line 2—2 of Fig. 1 and Fig. 3 is a plan view of the sliding plate which will be hereinafter referred to. Figs. 4 and 5 are respectively sectional elevations at right angles to each other and Fig. 6 is a plan view of a part of the mechanism which will be hereinafter referred to.

Referring to these drawings:—I form the bins or vessels $a$ of rectangular or other shape with a hinged or other lid $b$ on top or at the side for filling the vessels with tea or other substances. According to my improvements I form the vessel $a$ with an extra upper bottom $c$ of curved formation from the side $a^1$ and with an aperture $d$ at central flat part $c^1$. Below this bottom $c$ I fit a plate or false bottom $e$ which may be curved as shown, or flat, which slides on rails or projecting ledges $f$ under the bottom $c$ and below this sliding plate $e$ I fit a portable scoop or like vessel $g$ which slides between this plate $e$ and the bottom $a^2$ of the vessel proper through an aperture in front of vessel $a$. Pins or other projecting surfaces $h$ or the like are formed on the under surface of the front part of sliding plate $e$ and ledges or recesses $i$ or the like are formed at the sides of scoop vessel $g$ which engage with the projections $h$ on front part of sliding plate $e$, so that when the scoop $g$ is pushed inward it acts on the sliding plate $e$ and pushes it backward to uncover the aperture $d$ on upper bottom $c$ of vessel $a$, and the tea or other substances automatically fall into and fill the scoop $g$. By withdrawing the filled scoop $g$ the sliding plate $e$ is drawn along with it until projections $j$ on its front end come against downwardly abutting surfaces $k$ on the rails or side ledges $f$ and prevent further withdrawal of plate $e$ which now fills or covers the aperture $d$ in bottom $c$. While the scoop $g$ will now be liberated and withdrawn by the attendant and its contents can be delivered into the usual weighing scales; although for some substances the scoop $g$ can be made of a size to hold and deliver predetermined measured quantities or weights of material. Suitably shaped guides $l$ are preferably formed on vessel $a$ so that the scoop $g$ is guided centrally into its proper position. In some cases such as when flour is in the bin $a$ a weight $m$ or its equivalent connected to the lid $b$ or other suitable part of the vessel $a$ by a chain $n$ or the like is placed on the material in the bin $a$ so as to force same through the aperture $d$ into the scoop $g$ and prevent same from adhering to the sides of the bin $a$. The upper bottom $c$ of vessel $a$ is preferably fitted with angled plates $o$ or projections to act like a hopper and facilitate the automatic feed of material to the portable scoop $g$. For some materials a brush may be fitted instead of the plate $o^1$.

Figure 6:
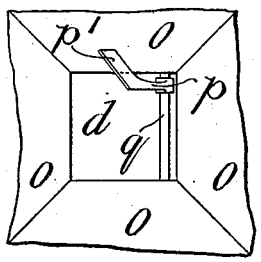

If desired the arrangement shown by Figs. 4 to 6 may be used either with or without the weight $m$ so as to force the material through the aperture $d$ into the scoop $g$. The arrangement consists of a lever $p$ having a portion of its length formed of a twisted blade formation $p^1$ which is mounted on a pin or rod $q$ secured in the sides of the aperture $d$. When the plate $e$ is in the position, shown by full lines, the end $p^2$ of the lever $p$ hangs in a downward direction through the aperture $d$ into the scoop $g$ and when the plate $e$ is moved forward (as shown by dotted lines) the lever $p$ is swung on the rod $q$ so that its portion $p^1$ dislodges the material into the scoop $g$. If desired the lever $p$ may be duplicated at the opposite end of rod $q$.

What I do claim as my invention and desire to secure by Letters Patent, is:—

The combination in a container, of a bin section, having an open hopper bottom, a drawer section below the hopper, a drawer in the drawer section and below the opening of the hopper, a transverse partition separating the drawer and bin sections and having an opening coincident with the opening in the hopper, a curved guide way, a flexible slide adapted to be moved in the guide-way, a projection on the slide coöperating with a recess in the drawer, a stirring arm mounted within the hopper, a lever on the stirring arm and adapted to be moved by the slide when the drawer is actuated.

In testimony whereof, I have signed my name to this specification, in the presence of two subscribing witnesses.

GEORGE ROGERS.

Witnesses:
 R. C. THOMSON,
 THOMAS BENNIE BROWNLIE.

Copies of this patent may be obtained for five cents each, by addressing the "Commissioner of Patents, Washington, D. C."